United States Patent [19]

Urban

[11] 3,756,352

[45] Sept. 4, 1973

[54] DISC BRAKE AND MOUNTING ARRANGEMENT

[76] Inventor: Era E. Urban, R. R. No. 1, Bluffton, Ohio 45817

[22] Filed: Dec. 29, 1970

[21] Appl. No.: 102,483

[52] U.S. Cl............. 188/18 A, 188/71.1, 280/96.3, 301/6 E
[51] Int. Cl............................................. B60t 1/06
[58] Field of Search.................. 188/18 A, 72.7, 25, 188/26, 71.1; 301/11 R, 6 E; 280/96.3

[56] References Cited

UNITED STATES PATENTS

| | | | |
|---|---|---|---|
| 2,943,827 | 7/1960 | Hartel et al....................... | 188/18 A |
| 2,888,100 | 5/1959 | Chandler........................... | 188/18 A |
| 1,613,541 | 1/1927 | Smith............................. | 188/73.2 X |
| 2,268,329 | 12/1941 | Ash.................................. | 188/18 A |
| 3,208,557 | 9/1965 | Burnett........................... | 188/72.7 X |
| 3,478,844 | 11/1969 | Beuchle........................... | 188/18 A |

FOREIGN PATENTS OR APPLICATIONS

| | | | |
|---|---|---|---|
| 987,136 | 4/1951 | France............................. | 188/18 A |
| 952,444 | 3/1964 | Great Britain.................... | 188/18 A |
| 372,167 | 6/1939 | Italy................................. | 188/18 A |

*Primary Examiner*—George E. A. Halvosa
*Attorney*—Larson, Taylor & Hinds

[57] ABSTRACT

A disc brake for a wheel rotatably mounted on an axle in which the fixed and moveable brake elements are in alignment with the vertical centerline of the wheel tread. The brake comprises a non-rotating anchor member fixedly secureable to the axle at a point in alignment with the vertical centerline of the tread of a wheel mounted on the axle and a brake disc fixedly secureable to the wheel for rotation therewith in alignment with the center-line of the tread. A pair of brake shoe members positioned on opposite sides of the brake disc are mounted on the anchor member such that they do not rotate relative thereto, but are permitted a limited amount of axial movement to engage with, and disengage from the brake disc. The brake also includes a member, such as a hydraulically operated cam member, for applying a pressure load to move the brake shoe members into engagement with the brake disc. Due to the in-line arrangement of the tire, brake disc and anchor member, braking forces are applied at a point on the axle in the vertical centerline of the tire. In the event of failure of a brake on one of two wheels supported by a single axle, the in-line arrangement eliminates the tendency for sideways movement that would otherwise occur. The brake can be mounted in this "in-line" manner on a wheel which pivots for steering in which case the anchor member will be in line with the king pin and will turn with the wheel.

4 Claims, 7 Drawing Figures

United States Patent [19]
Urban
[11] 3,756,352
[45] Sept. 4, 1973
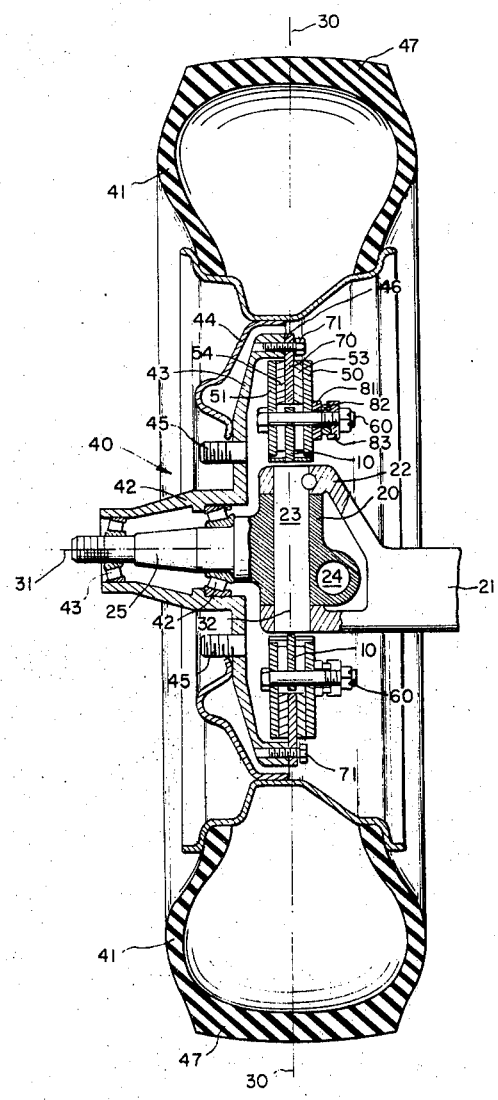

INVENTOR
ERA E. URBAN
BY Larson, Taylor and Hinds
ATTORNEYS

INVENTOR
ERA E. URBAN

BY Larson, Taylor and Hinds
ATTORNEYS

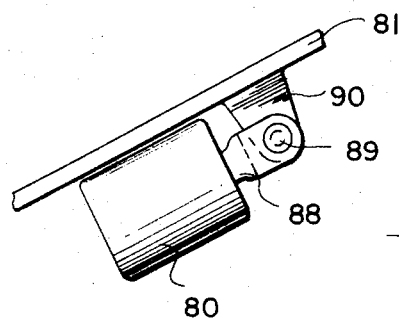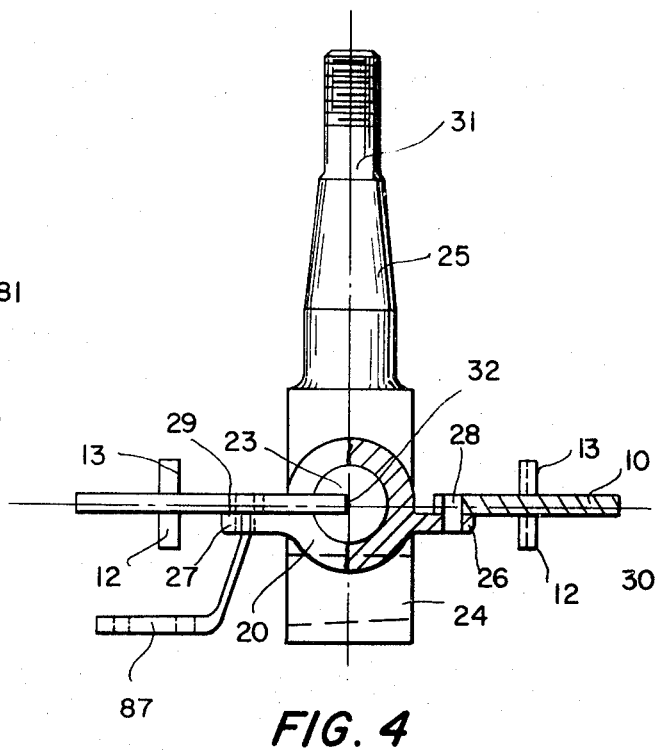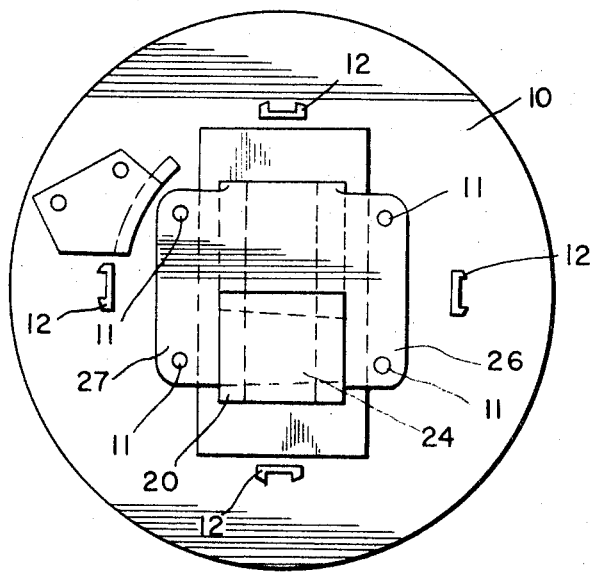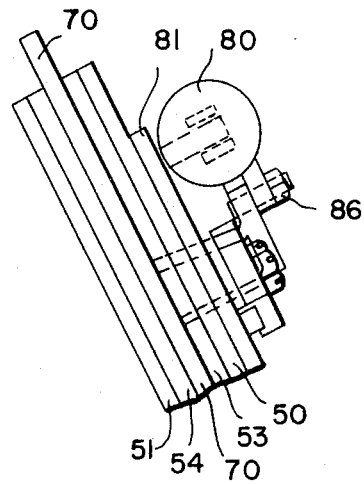

DISC BRAKE AND MOUNTING ARRANGEMENT

BACKGROUND OF THE INVENTION

The present invention relates to a disc brake for a wheeled vehicle, particularly vehicles such as automobiles which include two wheels mounted on a common axle. Still more particularly, the invention relates to a disc brake for such wheels which are pivotally mounted for turning.

The advantages of disc brakes are well known and this type of brake is becoming increasingly popular in automobiles. At the same time, safety considerations are becoming increasingly important in automotive design. A conventional safety feature in an automotive braking system is the provision of two or more independent braking systems. For example, in one system, a first master cylinder actuates one front wheel brake and two rear wheel brakes and a second master cylinder actuates the other front brake and the two rear wheel brakes. Where the front brakes are disc brakes, the braking force is applied to the brake disc or the wheel support or both at a point out of vertical alignment with the centerline of the tire. Thus, each time that the brake is applied, the braking forces are not in the vertical center-line of the tire resulting in a force tending to move the wheel sideways. Where both brakes are functioning, these forces on the two front wheels cancel and the motor vehicle is not subjected to a sideways drift. However, when the motor vehicle is provided with the dual-brake safety system mentioned above, if a failure occurs in one system, there will be an unbalanced sideways movement at one of the front wheels. This will tend to twist the wheel thus impeding a straight line stop.

It is an object of the present invention to provide a new disc brake assembly wherein the braking forces are applied in alignment with the centerline of the wheel. It is a further object of the present invention to provide such a disc brake for wheels which are pivotally mounted for turning.

BRIEF SUMMARY OF THE INVENTION

The foregoing and other objects which will be apparent to those having ordinary skill in the art are achieved according to the present invention by providing a disc brake assembly for a wheel relatably mounted on an axle, said assembly comprising non-rotating anchor member fixedly secureable to said axle at a point in alignment with the centerline of the wheel tread, a brake disc fixedly secureable to said wheel for rotation therewith in alignment with the centerline of said wheel tread; first and second brake shoe members positioned on opposite sides of said disc; mounting means for moveably securing said first and second brake shoe members to said anchor member, said mounting means preventing rotating motion of said brake shoe members relative to said anchor member and permitting limited axial motion of said brake shoe members relative to said disc; and means for applying a pressure load to said brake shoe members to engage said brake disc whereby the braking force is applied to said axle through said anchor member at a point in alignment with the centerline of said wheel tread. Where the wheel is pivotally mounted on a king pin for turning, the disc and anchor member are secured in alignment with the king pin and turn with the wheel. Thus, the braking forces are applied in alignment with the centerline of the tread irrespective of the type of mounting of the wheel.

DETAILED DESCRIPTION

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

FIG. 3 is a side elevation view showing details of the anchor plate member of FIG. 2;

FIG. 4 is a top view, partially in section, of FIG. 3;

Figure 7:
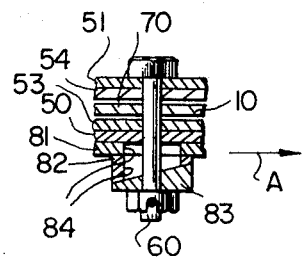
Figure 2:
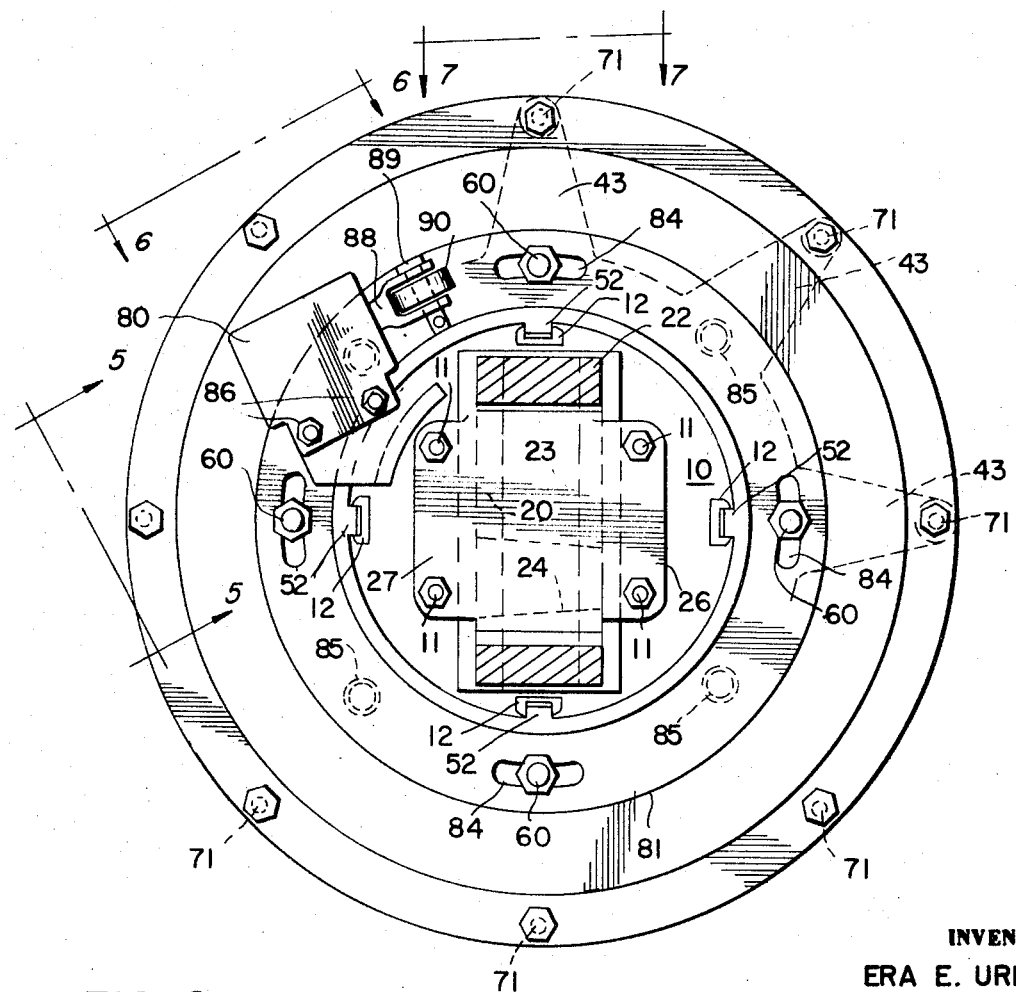
FIG. 2 is a side elevation view of the disc brake assembly of FIG. 1, partially in section, and omitting the wheel and tire shown in FIG. 1.

FIGS. 5 and 6 are side views of a brake actuating cylinder shown in FIG. 2, FIG. 5 being viewed in the direction of lines 5—5, and FIG. 6 being viewed along the lines 6—6; and FIG. 7 is a side sectional view of a portion of FIG. 2 taken along lines 7—7.

Figure 1:
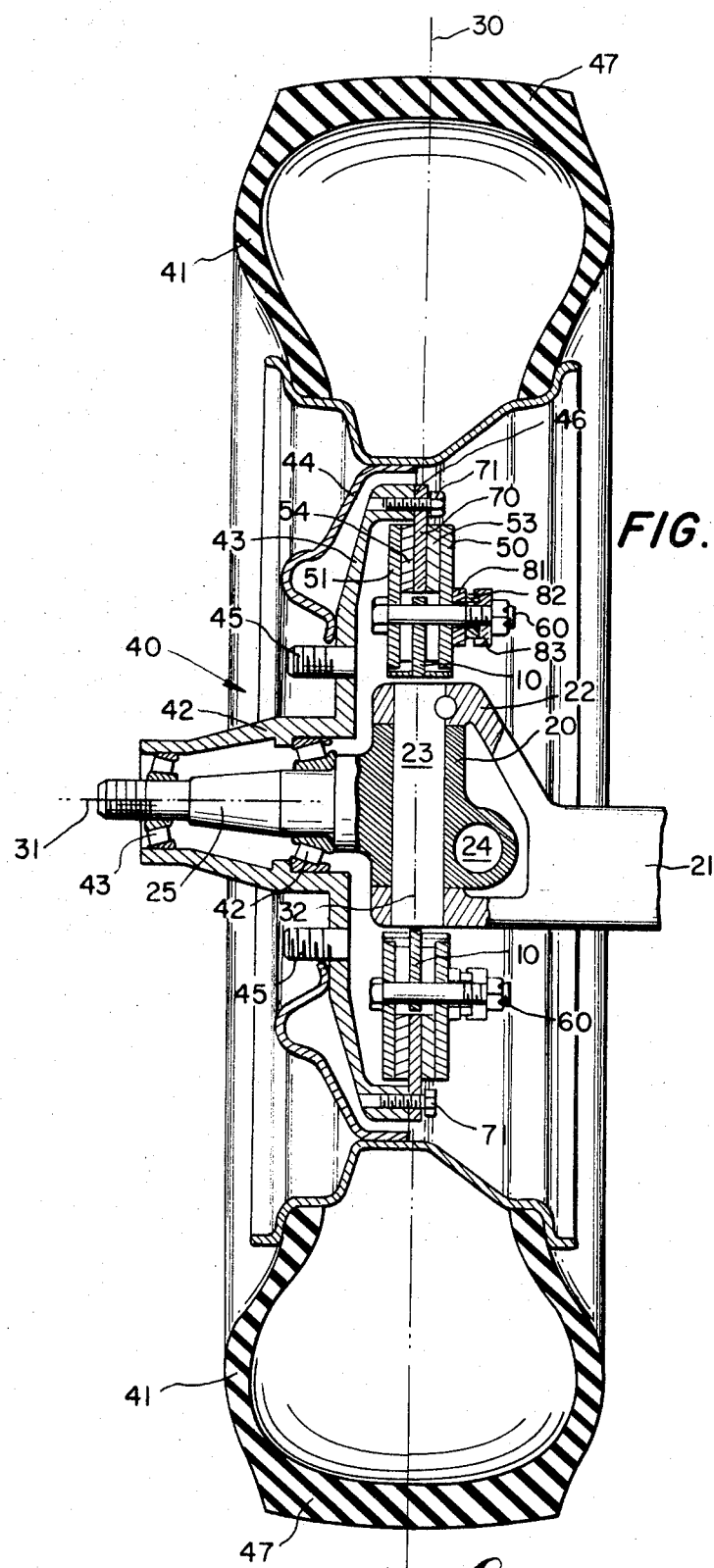
FIG. 1 is a cross sectional view of a disc brake assembly according to the invention showing the disc brake on a pivotally mounted front wheel axle.

With reference to FIGS. 1–6, a disc brake assembly according to the present invention comprises an anchor member 10 which is shown mounted in FIG. 1 secured to steering knuckle 20 of a front axle 21 of a motor vehicle such as an automobile. Steering knuckle 20 is pivotally mounted in axle yoke 22 of axle 21 by means of a conventional king pin 23 and includes a hole 24 for a steering arm. A wheel 40 including a conventional tire 41 is mounted by means of conventional inner and outer wheel bearings 42, 43, on spindle 25 of steering knuckle 20.

Steering knuckle 20 is formed with a pair of flanges 26, 27 extending outwardly on either side of the hole provided therein for king pin 23. Flanges 26 and 27 include flange surfaces 28, 29 (see FIG. 4) facing outwardly away from axle 21 in a plane 30 substantially normal to the longitudinal axis 31 of spindle 25. As seen best in FIGS. 2–4, anchor member 10 is secured to flanges 26, 27 by means of bolts 11. Flanges 26 and 27 and flange surfaces 28, 29 are positioned such that the braking forces acting through anchor member 10 pass through the centerline, or axis 32 of king pin 23. Where the anchor member is symmetrical, as in the case of anchor plate 10, this is achieved by positioning anchor plate 10 in line with vertical plane 30 passing through the axis 32 of king pin 23 normal to axis 31 of spindle 25. This is seen most clearly in FIG. 4 where plane 30 passes through the symmetrical center of anchor plate 10. Thus, any braking forces acting in plane 30 of member 10 act through the axis 32 of king pin 23.

Anchor plate 10, which is secureable to axle 21 in the manner shown, is utilized to mount an inner brake shoe member 50, and an outer brake shoe member 51 in such a way that the brake show members are prevented from rotating with respect to anchor member 10 but are permitted to move to a limited extent axially parallel to spindle axis 25 to apply a braking force to a brake disc 70 carried by wheel 40.

Inner brake shoe 50 is provided with four lugs 52 (FIG. 2) engageable in channels 12 welded to anchor plate 10. Outer brake shoe 51 is similarly provided with four lugs (not shown) engageable in channels 13 welded to the opposite side of anchor plate 10, two of these being shown in FIG. 4. Brake shoe members 50, 51 are mounted with their lugs in the channels on anchor plate 10 and are thus prevented from rotation with respect thereto. A plurality of bolts 60, four being utilized in the illustrated embodiment, extend through inner and outer brake shoe members 50, 51 and anchor plate 10 located intermediate the brake shoe members. The bolts couple the brake shoe members and permit a limited motion of the members parallel with spindle axis 31. Each bolt 60 passes through a hole in anchor plate 10 and thus the bolts may aid in preventing rotation of the brake shoe members relative to anchor plate 10. Inner and outer brake show members 50, 51 are provided, respectively, with conventional inner and outer brake shoes 53, 54 secured thereto for engaging brake disc 70 secured to wheel 40.

Brake shoe members 50, 51 are actuated by means of a hydraulic cylinder 80 which moves ring 81 bearing four integral cams 82 (see FIG. 7) in the direction of arrow A (clockwise in the sense of FIG. 2). Integral cams 82 bear against cams 83 provided on bolts 60. Ring 81 and integral cams 82 are provided with a slot 84 permitting movement relative to bolts 60 which are held stationary in anchor plate 10. As ring 81 moves in the direction of arrow A, brake shoe members 50, 51 are forced together thus engaging brake shoes 53, 54 with brake disc 70. The surfaces of cams 82 and 83 are preferably provided with ball bearings to facilitate brake engagement and disengagement. The brake is disengaged by means of compression springs 85 (see FIG. 2) extending between anchor member 10 and each brake shoe member. Recesses are provided in the brake show members and anchor member to position the springs.

Hydraulic cylinder 80 is secured to anchor plate 10 by means of bolts 86 securing the cylinder to bracket 87 welded to anchor plate 10. Piston 88 of cylinder 80 engages pin 89 mounted in bracket 90 welded to ring 81. Ring 81 and slots 84 are concentric with spindle axis 31. Thus, on actuation of cylinder 80, which is a conventional brake cylinder, ring 81 is rotated in the direction of arrow A about spindle axis 31 relative to non-rotating anchor plate 10. Brake shoes 53, 54 are thus caused to engage brake disc 70.

It will be recognized that brake shoe members 50, 51 are each free to move, to a limited extent, either inwardly or outwardly with respect to brake disc 70 which is not free to so move. Therefore, brake shoe members 50, 51 are self-centering with respect to brake disc 70 and an equal pressure will therefore be exerted on opposite sides of the brake disc.

Wheel 40 comprises a hub 42 provided with eight spokes 43. Wheel 40 is held on spindle 25 by conventional washer, castellated nut and other key not shown. The wheel includes a rim 44 mounted with conventional studs 45 and nuts (not shown) and is provided with a conventional tire 41.

Brake disc 70 is secured to spokes 43 by means of bolts 71. Spokes 43 include an inner flange surface 46 for positioning brake disc 70 in alignment with centerline 30 of thread area 47 of tire 41. See FIG. 2.

With reference to FIG. 2, it will be seen that wheel 40 includes a plane 30 extending through the center of the tread area around the periphery of the wheel normal to spindle axis 25. King pin axis 32 also lies in plane 30 and thus the wheel pivots at a point on the ground in line with king pin axis 32. In addition, brake disc 70 and anchor member 10 lie in plane 30. Thus, in a disc brake assembly according to the invention, the following items lie in plane 30 irrespective of the angle to which wheel 40 is pivoted about king pin 23: the center of tread area 47; brake disc 70; anchor plate 10; and king pin axis 32. Accordingly, if one front brake fails, a remaining front wheel brake will act in line with the wheel thus eliminating a turning motion that would result if the foregoing items were not in alignment as in the case of conventional disc brake assemblies.

What is claimed is:

1. In a wheeled vehicle comprising a wheel having a tread, said wheel being rotatably mounted on an axle and being pivotally mounted for pivoting about the vertical centerline passing through the wheel tread, a disc brake assembly comprising:

a non-rotating anchor member positioned within the wheel circumference and fixedly secured to said axle in position in fixed alignment with the centerline of the wheel tread;

a brake disc fixedly secured to said wheel for rotation therewith in fixed alignment with the centerline of said wheel tread;

first and second brake shoe members positioned at opposite sides of said disc;

mounting means positioned within the circumference of said wheel for moveably securing said first and second brake shoe members to said anchor member, said mounting means preventing rotation motion of said brake shoe members relative to said anchor member and permitting limited axial motion of said shoes relative to said disc; and means for applying a pressure load to said brake shoe members to engage said brake disc whereby the braking force is applied to said axle through said anchor plate at a point in fixed alignment with the centerline of said wheel tread.

2. A disc brake assembly as claimed in claim 1 wherein said axle comprises a yoke and king pin, said wheel being mounted for rotation on a spindle mounted for pivoting about said king pin, said anchor plate being secured to said spindle for pivoting therewith about said king pin, whereby said disc and anchor plate are in alignment during pivoting motion of said wheel on said axle whereby the braking force is applied to said axle through the anchor plate in fixed alignment with the centerline of said wheel tread irrespective of the pivotal position of said wheel.

3. A disc brake assembly according to claim 1 wherein said mounting means comprises a coupling member extending through said anchor plate and said brake shoe plates, said coupling member permitting a limited axial motion of said brake shoe members relative to said anchor plate; and wherein said pressure load applying means comprises a cam member having a surface engageable with a surface of said coupling member for urging said brake shoe members inwardly to engage said brake shoes with said disc.

4. A disc brake according to claim 3 wherein said cam member comprises an annular memb positioned concentrically with respect to said axle and wherein said assembly further includes hydraulic means for actuating said cam member.

* * * * *